(12) United States Patent
Davidov et al.

(10) Patent No.: US 7,836,346 B1
(45) Date of Patent: Nov. 16, 2010

(54) METHOD AND SYSTEM FOR ANALYZING SOFTWARE TEST RESULTS

(75) Inventors: Mikhail B. Davidov, St. Peterburg (RU); Irina N. Kuchkova, St. Peterburg (RU); Alexey Alexeevich Barilov, St. Peterburg (RU); Alexander R. Pastsyak, St. Peterburg (RU)

(73) Assignee: Oracle America, Inc., Redwood City, CA (US)

( * ) Notice: Subject to any disclaimer, the term of this patent is extended or adjusted under 35 U.S.C. 154(b) by 508 days.

(21) Appl. No.: 11/761,300

(22) Filed: Jun. 11, 2007

(51) Int. Cl.
*G06F 11/00* (2006.01)
(52) U.S. Cl. .................. 714/38; 717/124
(58) Field of Classification Search ............... None
See application file for complete search history.

(56) References Cited

U.S. PATENT DOCUMENTS

| | | | | |
|---|---|---|---|---|
| 6,418,543 | B1 * | 7/2002 | Goli et al. ............... | 714/38 |
| 7,159,021 | B2 * | 1/2007 | Boldman et al. ........... | 709/223 |
| 7,360,120 | B2 * | 4/2008 | De Pauw et al. ........... | 714/45 |
| 7,386,579 | B2 * | 6/2008 | Henderson et al. ......... | 1/1 |
| 2003/0212924 | A1 * | 11/2003 | Avvari et al. ............ | 714/38 |
| 2004/0148590 | A1 * | 7/2004 | Lapitski et al. .......... | 717/124 |
| 2004/0153822 | A1 * | 8/2004 | Arcand et al. ............ | 714/38 |
| 2004/0153837 | A1 * | 8/2004 | Preston et al. ........... | 714/39 |
| 2007/0006037 | A1 * | 1/2007 | Sargusingh et al. ........ | 714/38 |
| 2007/0006041 | A1 * | 1/2007 | Brunswig et al. .......... | 714/38 |
| 2007/0226691 | A1 * | 9/2007 | Happell et al. ........... | 717/124 |
| 2008/0209275 | A1 * | 8/2008 | Kwan et al. .............. | 714/38 |
| 2009/0006897 | A1 * | 1/2009 | Sarsfield ................ | 714/38 |
| 2009/0271351 | A1 * | 10/2009 | Kandasamy et al. ......... | 706/47 |

OTHER PUBLICATIONS

Ed Ort, The Java Compatibility Test Tools: JavaTest Harness, Oct. 2001, pp. 1-11.

* cited by examiner

*Primary Examiner*—Christopher S McCarthy
(74) *Attorney, Agent, or Firm*—Osha•Liang LLP

(57) ABSTRACT

A method for analyzing software test results that includes identifying a test result of a failed test case in a test log, determining whether the failed test case has a related defect report, and storing a selectable link to the related defect report in the test result when the failed test case has the related defect report.

20 Claims, 6 Drawing Sheets

METHOD AND SYSTEM FOR ANALYZING SOFTWARE TEST RESULTS

BACKGROUND

In general, software testing is a systematic process designed to find differences between the expected behavior of a software system as specified in a software requirements document and the actual behavior of the software system. In other words, software testing is an activity for finding defects, commonly known as bugs, in the software system.

Complex software systems are tested, at least in part, using automated testing tools. More specifically, test cases are developed to test specific requirements or features of a software system. The test cases are then used as input to an automated testing tool that uses the test cases to test the software system. As the test cases are executed, the testing tool creates a test log that includes the result of executing each test case. The test log is then examined to determine if any of the test cases failed, thus indicating defects in the software system. In addition, the result of each of the failed test cases is examined to determine if the defect indicated is a known defect (i.e., a defect that was previously detected and recorded in a defect report in a defect tracking system) or a new defect.

The examination of the test log to determine if a failed test case is an indication of a known defect or a new defect is typically a manual process. That is, a software tester looks at each test result in the test log. If the test result indicates a failed test case, the software tester then determines whether the indicated defect is known by determining if there is a defect report for the defect. In some testing systems, a test case may include identifiers of any defect reports (e.g., defect report numbers) related to that test case. In such systems, the software tester can look up the test case in a test case repository and check to see if the test case includes any defect report identifiers. Further, in some defect tracking systems, an identifier for a test case (e.g., a test case number or name) related to a defect may be included in the defect report. In such systems, a software tester can search for defect reports related to a failed test case using the identifier for the test case.

SUMMARY

In general, in one aspect, the invention relates to a method for analyzing software test results that includes identifying a test result of a failed test case in a test log, determining whether the failed test case has a related defect report, and storing a selectable link to the related defect report in the test result when the failed test case has the related defect report.

In general, in one aspect, the invention relates to a system for analyzing software test results that includes a test harness configured to execute a plurality of test cases and generate a test log, wherein the test log comprises test results for a portion of the plurality of test cases, and a test log analysis component. The test log analysis component is configured to identify a test result of a failed test case in the test log, determine whether the failed test case has a related defect report, and store a selectable link to the related defect report in the test result when the failed test case has the related defect report.

In general, in one aspect, the invention relates to a computer readable medium including computer program code embodied therein for analyzing software test results, the computer program code including instructions to identify a test result of a failed test case in a test log, determine whether the failed test case has a related defect report, and store a selectable link to the related defect report in the test result when the failed test case has the related defect report.

Other aspects and advantages of the invention will be apparent from the following description and the appended claims.

DETAILED DESCRIPTION

Figure 1:
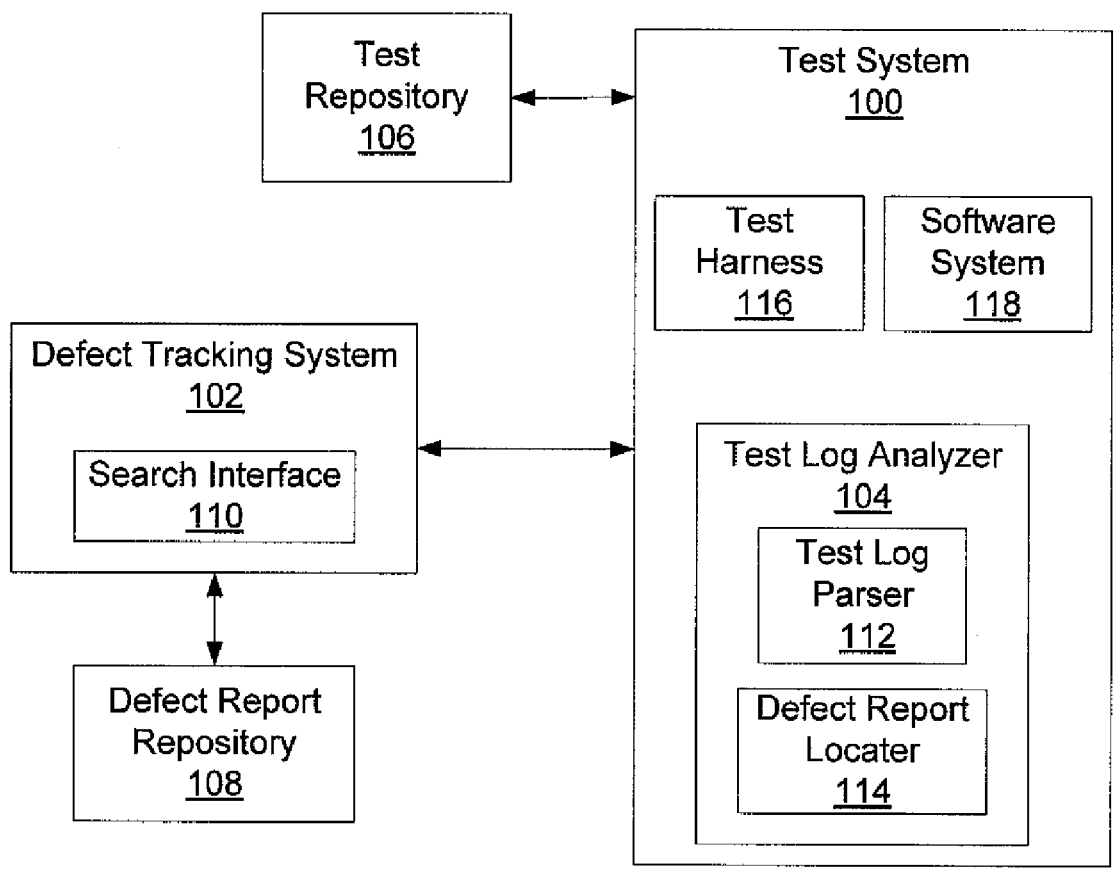
FIG. 1 shows a schematic diagram of a system in accordance with one or more embodiments of the present invention.

Specific embodiments of the invention will now be described in detail with reference to the accompanying figures. Like elements in the various figures are denoted by like reference numerals for consistency.

In the following detailed description of one or more embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

In general, embodiments of the invention are directed to a system and method for analyzing a test log and locating defect reports related to failed test cases in the test log. More specifically, a test log is analyzed to locate failed test cases. When a failed test case is found, a defect report repository is searched for any defect reports related to the failed test case. If a related defect report is found, a link to the defect report is added to the test result for the failed test case in the test log. More than one defect report may be related to a failed test case and a defect report may be related to more than one failed test case. A user may then view the resulting updated test log and identify those failed test cases having one or more related defect reports (i.e., known defects) and those failed test cases that do not have a related defect report (i.e., new defects) by looking for a link to a defect report in the test result. In addition, the user may access any defect reports related to a failed test case while viewing the test log by selecting the link or links in the test result for the failed test case.

FIG. 1 shows a schematic diagram of a system for analyzing a test log in accordance with one or more embodiments of the present invention. As shown in FIG. 1, the system includes a test system (100) and a defect tracking system (102). The system further includes a test repository (106) connected to the test system (100) and a defect report repository (108) connected to the defect tracking system (102).

The test repository (106) stores test suites to be used by a test harness (e.g., test harness (116)) to test one or more software systems (e.g., software system (118)). A test suite may include test code for one or more tests, test data, configuration information for configuring the execution environment in preparation for running the tests, and/or information specifying an execution order of the tests. In one or more embodiments of the invention, a test suite includes a test script, a test finder, configuration data, test descriptions, and tests. The test script is invoked by the test harness (116) to run the tests and return the status. The test script includes functionality to interpret a test description for a test, break down the execution of the test into a series of logical steps based on the information in the test description, and convert the logical execution steps into concrete actions. The test finder is used by the test script to find, read, and parse test descriptions.

A test is the source code and any accompanying information that exercises a particular feature, or part of a feature of a software system (e.g., software system (118)). A single test may include one or more test cases. A test case tests an assertion in the specification of a software system (e.g., software system (118)), or a particular feature, or part of a feature, of an assertion. Within each test, a test case has a unique identifier. The accompanying information may include test documentation, auxiliary data files, and any other resources used by the source code. In one or more embodiments of the invention, a test case is precompiled and ready for execution.

A test description is information that describes a test so that the test can be executed. The information may include the name of test, the pathname of the file containing the test, execution parameter, identifiers for related defect reports, and any other information that affects how the test is executed. A test description may be embodied in html files, xml file, text files or any other suitable format. A test description may also be embedded as comments in the source code of a test.

Configuration data is information needed to convert logical test steps into concrete steps in the environment in which the test are to be executed. This information may include, for example, Internet Protocol (IP) addresses, system names, and path names that change from system to system. In one or more embodiments of the invention, a test suite includes a configuration interview that is executed to acquire the configuration data from a user (e.g., a software tester) of the test system (100).

The test repository (106) may be any device or medium capable of storing test suites. For example, a test repository (106) may be one or more databases, a directory service, one or more flat files, a spreadsheet, an extensible markup language (XML) file, or any other suitable data repository. Further, the test repository (106) may be directly connected to the test system (100) or may be connected to the test system (100) via a network (not shown). The network may be a wide area network (WAN), a metropolitan area network (MAN), a local area network (LAN), a public network (such as the Internet or World Wide Web), or any combination thereof. Further, the network may include one or more networks interconnected by other network types (e.g., distinct LANs connected by one or more WANs).

The test system (100) includes a test harness (116), a software system (118), and a test log analyzer (104). The software system (118) is software to be tested using the test system and may be an operating system, a programming language implementation, an application (e.g., word processing software, game software, accounting software, etc.) or any other computer program. In one or more embodiments of the invention, the software system (118) is tested on the same computer system where the test harness (116) is installed. In other embodiments of the system, the software system (118) is tested on a second computer system connected to the computer system hosting the test harness.

The test harness (116) is configured to manage the testing of the software system (118). More specifically, the test harness (116) includes functionality to automatically load tests included a test suite stored in the test repository (106), to configure the environment of the test system (100) to run the tests in the test suite, to execute the tests to test the software system (118), and to generate one or more test logs reporting the results of executing those tests. In one or more embodiments of the invention, the test harness (116) includes a graphical user interface (GUI) that provides various windows and menus to configure, run, and track tests. In some embodiments of the invention, the GUI includes functionality to display the test logs. Further, in one or more embodiments of the invention, the test harness is the JavaTest™ Harness. JavaTest™ is a trademark of Sun Microsystems®, Inc. located in Santa Clara, Calif. In some embodiments of the invention, the test harness is the NokiaTCK Harness.

A test log includes the results of executing tests in the test suite. The test log includes a test result for each test case executed that identifies the test case and gives the result of executing the test case (e.g., pass, fail, error). The test harness (106) may generate a test log in different formats including text, hypertext markup language (HTML), extensible markup language (XML) and combinations thereof. Further, a test log may be stored in the memory of a computer system hosting the test system (100), in one or more files in a file system, in a data base, or any in any other suitable storage medium. In one or more embodiments of the invention, the test harness (106) generates separate test logs for passed test cases, failed test cases, and test cases with execution errors. In other embodiments of the invention, the test harness (106) generates a single test log containing all test results.

In one or more embodiments of the invention, the test system (100) is configured to test an implementation of a Java™ technology specification in accordance with a Technology Compatibility Kit (TCK). A TCK is a set of tools, documentation, and tests for testing an implementation of a Java™ technology specification for compliance with the specification. A TCK includes a test harness and a TCK test suite. In such embodiments, the test harness (116) is the test harness provided by the TCK, the software system (116) is the implementation of the Java™ specification, and the TCK test suite is stored in the test repository (106). The TCK may be any available TCK for a Java™ technology specification, including, for example, the PDA Optional Packages for the J2ME™ (Java™ 2, Micro Edition) Platform TCK available from IBM Corporation, the Location Application Programming Interface (API) for J2ME™ TCK, the Scalable 2D Vector Graphics API for J2ME™ TCK, the Advanced Multimedia Supplements API for J2ME™, the Mobile 3D Graphics API for J2ME™, the Mobile Internationalization API TCK, and the SIP API for J2ME™ TCK, available from Nokia, Inc., and the Security and Trust Services API for J2ME™ TCK, the Mobile Media API TCK, and the Mobile Service Architecture TCK, available from Sun Microsystems, Inc. Java™ and J2ME™ are trademarks of Sun Microsystems®, Inc. located in Santa Clara, Calif.

The test log analyzer (104) includes functionality to locate test results of failed test cases in a test log and add links to related defect reports, if any, to those test results. More specifically, the test log analyzer (104) includes a test log parser (112) and a defect report locater (114). The test log parser (112) includes functionality to parse a test log generated by the test harness (116) to locate test results for failed test cases in the test log and retrieve identifying information for the failed test cases from the test results.

How the test log parser (112) identifies a test result for a failed test case depends on the content of the test log. As previously mentioned, in some embodiments of the invention, the test harness (116) generates a separate test log for failed test cases. In such embodiments, the test log parser (112) need only locate the identifying information for a failed test case in each test result in the log. In embodiments of the invention in which test results for passed and failed test cases are combined in a single log, the test log parser (112) includes functionality to distinguish a test result for a failed test case from a test result for a passed test case. For example, if the test log is in text format, the test log parser (112) may search for specific text strings in the test log (e.g., "failed," "error," "not run") that may occur in the test result of a failed test case. Once the test log has located a test result for a failed test case, the test log parser (112) may then parse the test result to locate the identifying information for the failed test case in the test result.

The defect report locater (114) includes functionality to use the identifying information for a failed test case to locate defect reports related to the failed test case. More specifically, the defect report locater (114) includes functionality to use the identifying information for a failed test case to search a defect report repository (e.g., defect report repository (108)) for defect reports related to the failed test case. As is explained in more detail below, a defect report related to a failed test case includes a unique identifier for the failed test case. In one or more embodiments of the invention, the defect report locater (114) determines the unique identifier for the failed test case using the identifying information for the failed test case. In some embodiments of the invention, the identifying information is the unique identifier. In other embodiments of the invention, the defect report locater (114) generates the unique identifier using the identifying information. For example, if the identifying information is a text string containing the name of the test case, the defect report locater (114) may concatenate the text string with a text string identifying the software system under test (e.g., software system (118)) to generate the unique identifier.

Table 1 shows an example of a test log in html format that contains only test results for failed test cases in accordance with one or more embodiments of the invention. In this test log, each href is a link to a detailed test result file and also contains the name of the test case. Therefore, the test log parser (112) may search for each href and extract the identifying information for the failed test case (i.e., the test case name) from the href.

TABLE 1

<!DOCTYPE HTML PUBLIC "-//W3C//DTD HTML 4.0 Transitional//EN">
<html>
<head>
<title>JavaTest : Tests that failed</title>
<link rel=stylesheet href="report.css" type="text/css">
</head>
.....
.....
<h1>JavaTest : Tests that failed</h1>
Tests are grouped by their final status message.
<h4>test cases: 1; all failed; first test case failure:</h4>
<ul>
<li>
<a href="../api/OTA/javax_microedition/midlet/MIDlet/index_Platform RequestBrowse.jtr"
api/OTA/javax_microedition/midlet/MIDlet/index.html#Platform RequestBrowse</a>
: PlatformRequestBrowse - Test for launch the native browsing application from MIDlet.platformRequest( ) method
<li>
<a href="../api/OTA/javax_microedition/midlet/MIDlet/index_Platform RequestCancelInstall.jtr"
api/OTA/javax_microedition/midlet/MIDlet/index.html#Platform RequestCancelInstall</a>
: PlatformRequestCancelInstall - Test for cancel installation MIDlet fromMIDlet.platformRequest( ) method The defect report locater (114) includes functionality to search the defect report repository (108) using the search interface (110) in the defect tracking system (102). More specifically, the defect report locater (114) includes functionality to generate a search request requesting identifying information for all defect reports in the defect report repository that include the unique identifier for a failed test case and to send the search request to the search interface (110). In one or more embodiments of the invention, the search request is a Structured Query Language (SQL) query.

The defect report locater (114) further includes functionality to use the result of the search request to annotate the test result for the failed test case with links to the defect reports identified in the search request result. In one or more embodiments of the invention, the search request result includes the Uniform Resource Locaters (URLs) for the related defect reports. In other embodiments of the invention, the search request result includes identifying information that defect report locater (114) uses to determine the URLs for the related defect reports. For example, the search request result may include defect report numbers or names that the defect report locater (114) may use to generate URLs. The defect report locater (114) uses the URLs to create links to the related defect reports in the test result for the failed test case in the test log.

A defect report repository (108) stores defect reports for defects found in one or more software systems (e.g., software system (118)). A defect report includes information about a defect in a software system that may include a defect identifier that uniquely identifies the defect, a status of the defect, the name or other identifier of the software system (e.g., software system (118)) in which the defect was found, the function, module, feature, screen, etc. where the defect occurred, a full description of the defect, a summary description of the defect, a description of how to reproduce the defect, etc. A defect report may also include information uniquely identifying each test case related to the defect. In one or more embodiments of the invention, a unique identifier for each test case related to the defect is stored as a keyword in the defect report.

The defect report repository (108) may be any device or medium capable of storing defect reports. For example, a defect report repository (108) may be one or more databases, a directory service, one or more flat files, a spreadsheet, an extensible markup language (XML) file, or any other suitable data repository. Further, the defect report repository (108) may be directly connected to the defect tracking system (102) or may be connected to the defect tracking system (102) via a network (not shown). The network may be a wide area network (WAN), a metropolitan area network (MAN), a local area network (LAN), a public network (such as the Internet or World Wide Web), or any combination thereof. Further, the network may include one or more networks interconnected by other network types (e.g., distinct LANs connected by one or more WANs).

The defect tracking system (102) is a software application for tracking defects in software systems (e.g., software system (118)). The defect tracking system (102) includes functionality for a user to manage defects in a software system. This functionality includes entering new defect reports, modifying existing defect reports, and generating various reports using the content of the defect reports. The defect tracking system (102) also includes a search interface (110) that provides an application programming interface (API) that may be used by other software applications (e.g., the test log analyzer (104)) to retrieve information from the defect report repository (108). More specifically, the search interface (110) includes functionality to receive a request from the defect report locater (114) for identifying information for all defect reports related to a test case, to locate the related defect reports, if any, in the defect report repository (108), and to return identifying information for the related defect reports to the defect report locater (114). In one or more embodiments of the invention, the search interface locates the related defect reports based on information identifying the test case stored in the defect reports (e.g., a unique identifier for the test case stored as a keyword in the defect report).

Although embodiments of the invention have been described in which the test log analysis is performed after a test log is generated, one of ordinary skill in the art will understand that the annotation of test results with links to related defect reports may also be performed as the test log is generated. That is, the test log analyzer (104) may be integrated with the test harness (116) such that as a test result for a failed test is added to the test log, a link to a related defect report, if any, is added to the test result.

Figure 2:
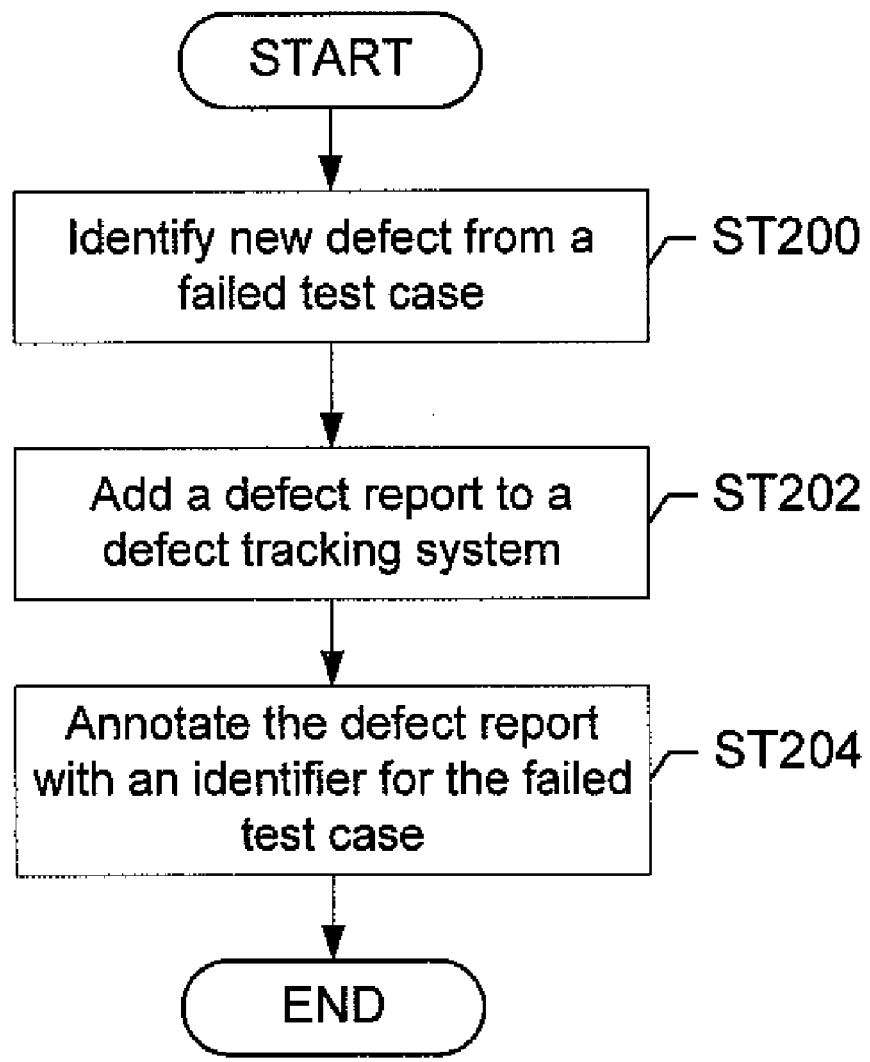
FIGS. 2 and 3 show flowcharts of methods in accordance with one or more embodiments of the present invention.
Figure 3:
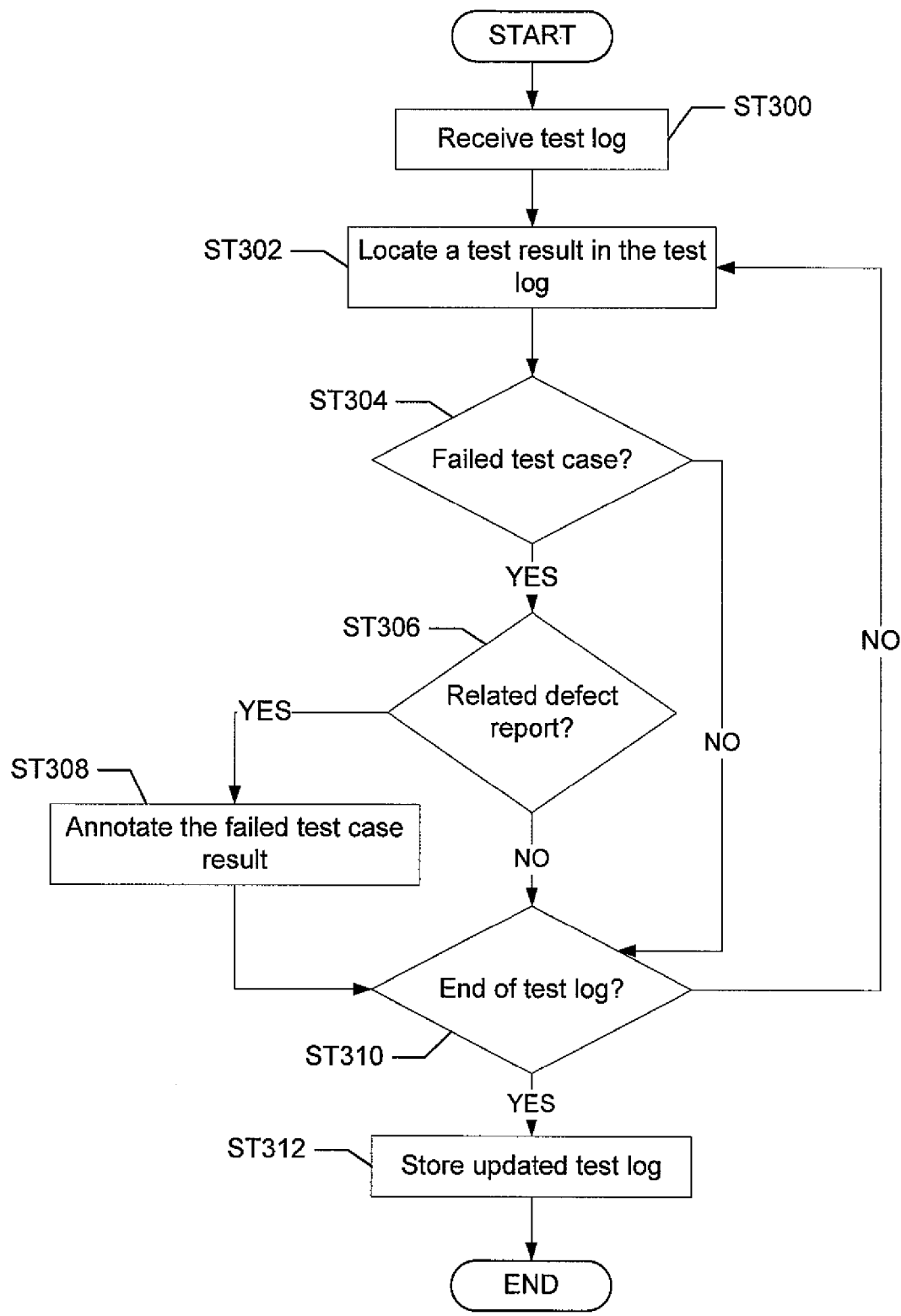

FIGS. 2 and 3 show methods in accordance with one or more embodiments of the invention. While the various steps in these flowcharts are presented and described sequentially, one of ordinary skill in the art will appreciate that some or all of the steps may be executed in different orders and/or in parallel. Further, in some embodiments of the invention, one or more of the steps may be omitted, repeated, and/or performed in a different order. Accordingly, the specific arrangement of steps shown in these figures should not be construed as limiting the scope of the invention.

FIG. 2 shows a flowchart of a method for associating a defect report with a test case in accordance with one or more embodiments of the present invention. Initially, a software tester identifies a new defect from a failed test case (ST200). Specifically, in one or more embodiments of the invention, the software tester analyzes a test log of test results to locate failed test cases. In some embodiments of the invention, the software tester may view the test log in a web browser. In one or more embodiments of the invention, the software tester may view the test log in a GUI of a test harness. The software tester determines whether the defect indicated by a failed test case is known or new by looking for links to related defect reports in the test result of the failed test case. If no link is present in the test result, a new defect is indicated.

The software tester then adds a defect report describing the new defect to a defect tracking system (ST202). The software tester also annotates the defect report with a unique identifier for the failed test case (ST204) to create an association between the defect report and the test case that generated the defect. In some embodiments of the invention, the identifier is stored as a keyword in the defect report.

In some instances, a failed test case may indicate multiple defects. If multiple defects are indicated, the software tester adds a defect report to the defect tracking system for each defect. Further, the software tester annotates each of these defect reports with the unique identifier of the failed test case.

FIG. 3 shows a flowchart of a method for analyzing test results in a test log in accordance with one or more embodiments of the present invention. Initially, a test log containing the test results from executing a test suite is received from a test harness (ST300). The test log is then parsed to locate a test result in the test log (ST302). A determination is then made as to whether the test result indicates a failed test case (ST304). In some embodiments of the invention, this determination is made by searching the test result for a text string including the word "failed." If the test result does not indicate a failed test case, the next test result, if any, in the test log is processed (ST310).

If the test result indicates a failed test case, a determination is then made as to whether there is a defect report related to the failed test case (ST306). In one or more embodiments of the invention, identifying information for the failed test case is retrieved from the test result and used to search a defect report repository for any defect reports related to the failed test case. In some embodiments of the invention, the identifying information for the failed test case includes a name of the test case that is used to generate a unique identifier for the test case. The unique identifier is then used as search criteria for locating related defect reports. This unique identifier has been previously stored in any defect report in the defect report repository that is related to the test case. In one or more embodiments of the invention, the unique identifier is stored as a keyword in each related defect report.

If no related defect report is found, the next test result, if any, in the test log is processed (ST310). If a related defect report is found, the test result for the failed test in the test log is annotated (ST308). That is, a link to the related bug report is added to the test result. In one or more embodiments of the invention, the link includes a URL of the related defect report. If multiple related defect reports are found, multiple links are added to the test result. Then, the next test result, if any, in the test log is processed (ST310). Once all test results in the test log are processed, the updated test log is stored (ST312). A software tester may then view the test log and determine which of the failed test case results have related defect reports and which do not. The software tester may also select the links in the annotated test results to view the related defect reports.

Figure 4A:
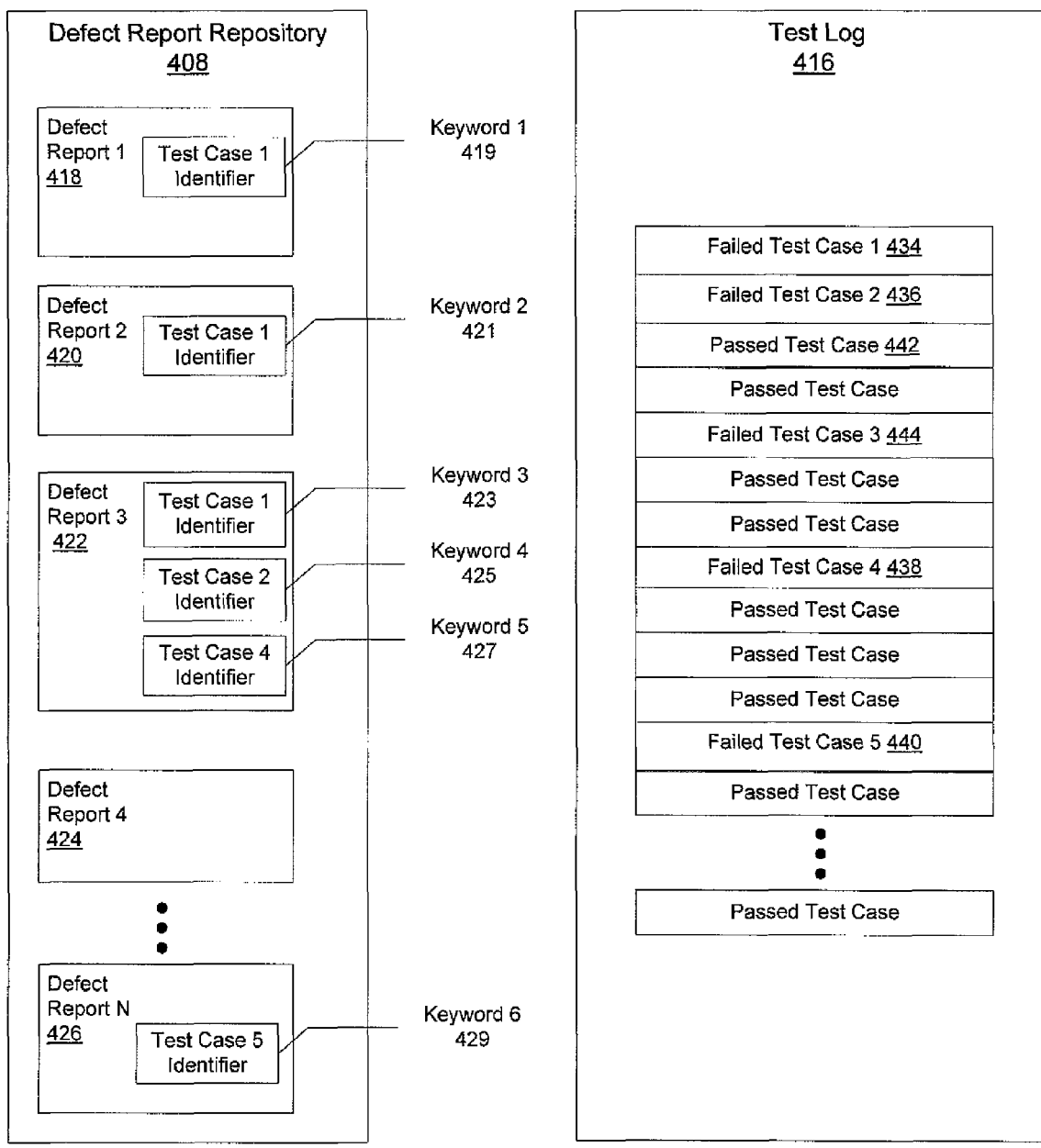
FIGS. 4A and 4B show an example in accordance with one or more embodiments of the invention.
Figure 4B:
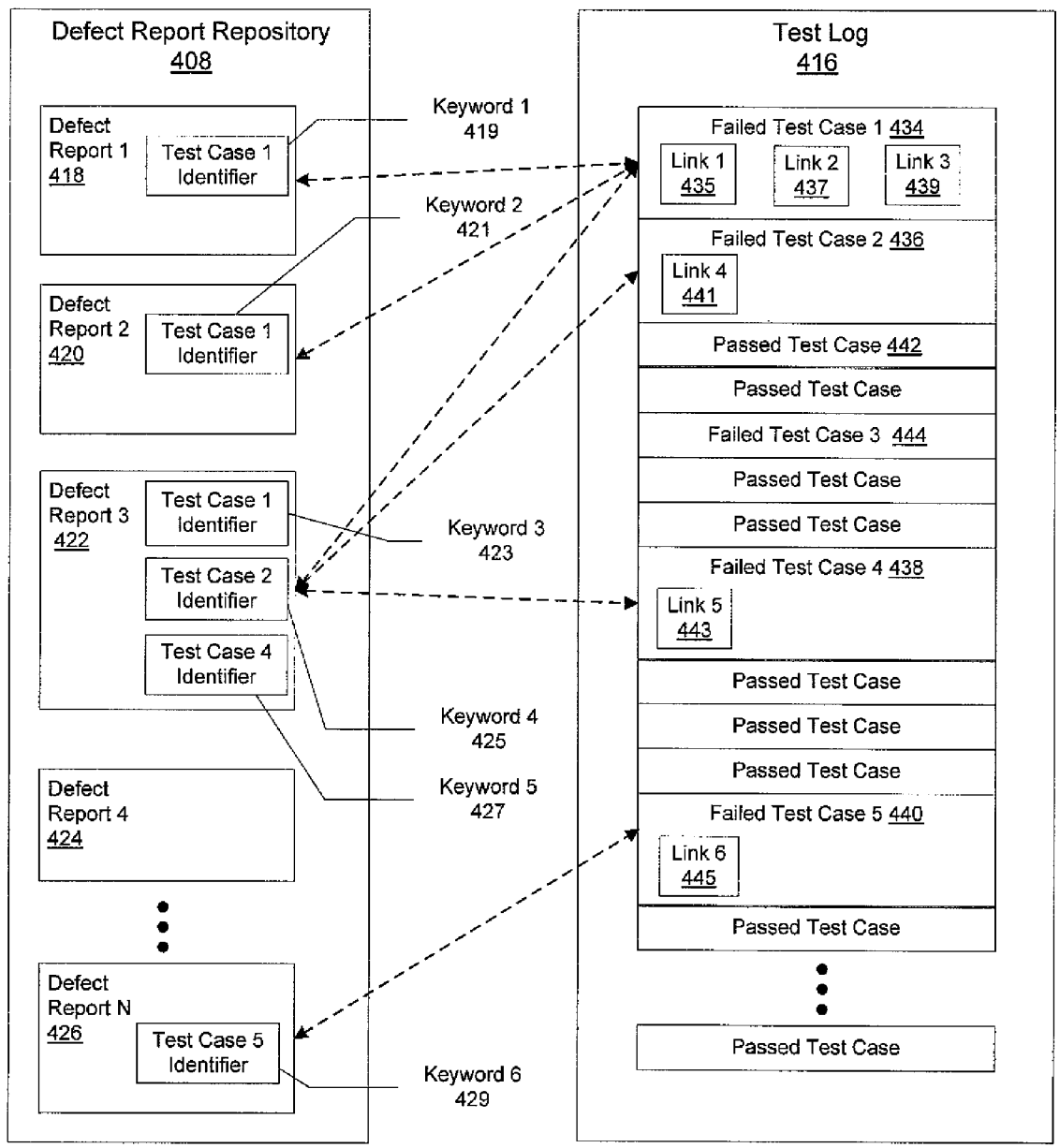

FIGS. 4A and 4B show an example of annotating a test log in accordance with one or more embodiments of the invention. In FIG. 4A, the defect report repository (408) includes multiple defect reports (e.g., Defect Report 1 (418), Defect Report 2 (420), Defect Report 3 (422), Defect Report 4 (424), Defect Report N (426)) that have been entered to track defects identified by executing test cases on a software system. Some of the defect reports are related to test cases in a test repository (not shown) (e.g., Defect Report 1 (418), Defect Report 2 (420), Defect Report 3 (422), Defect Report N (426)). This relationship is indicated by a keyword or keywords (e.g., Keyword 1 (419), Keyword 2 (421), Keyword 3 (423), Keyword 4 (425), Keyword 5 (427), Keyword 6 (429)) stored in the defect reports. These keywords are identifiers for the test case(s) to which the defect reports are related. In this example, Defect Report 1 (418) is related to Test Case 1, Defect Report 2 (420) is related to Test Case 1, Defect Report 3 is related to Test Cases 1, 2, and 4, and Defect Report N (426) is related to Test Case 5.

The test log (416) illustrates a test log prior to processing by a test log analyzer. The test log (416) is generated by a test harness and includes test results from executing test cases on a software system. The test log includes test results for both passed test cases (e.g., Passed Test Case (442)) and failed test cases (e.g., Failed Test Case 1 (434)). Furthermore, the test log (416) includes test results indicating failure of test cases that have related defect reports in the defect report repository (408) (e.g., Failed Test Case 1 (434), Failed Test Case 2 (436), Failed Test Case 4 (438), Failed Test Case 5 (440)). The test log (416) also includes at least one test result indicating failure of a test case that does not have a related defect report in the defect report repository (408) (e.g., Failed Test Case 3 (444)).

FIG. 4B shows the test log (416) after processing by a test log analyzer. Each test result for a failed test case that has a related defect report in the defect report repository (408) (e.g., Failed Test Case 1 (434), Failed Test Case 2 (436), Failed Test Case 4 (438), Failed Test Case 5 (440)) now contains a link (e.g., Link 1 (435), Link 2 (437), Link 3 (439), Link 4 (441), Link 5 (443), Link 6 (445)) to the related defect report. Furthermore, the test results for failed test cases that do not have related defect reports (e.g., Failed Test Case 3 (444)) do not contain links.

Figure 5:
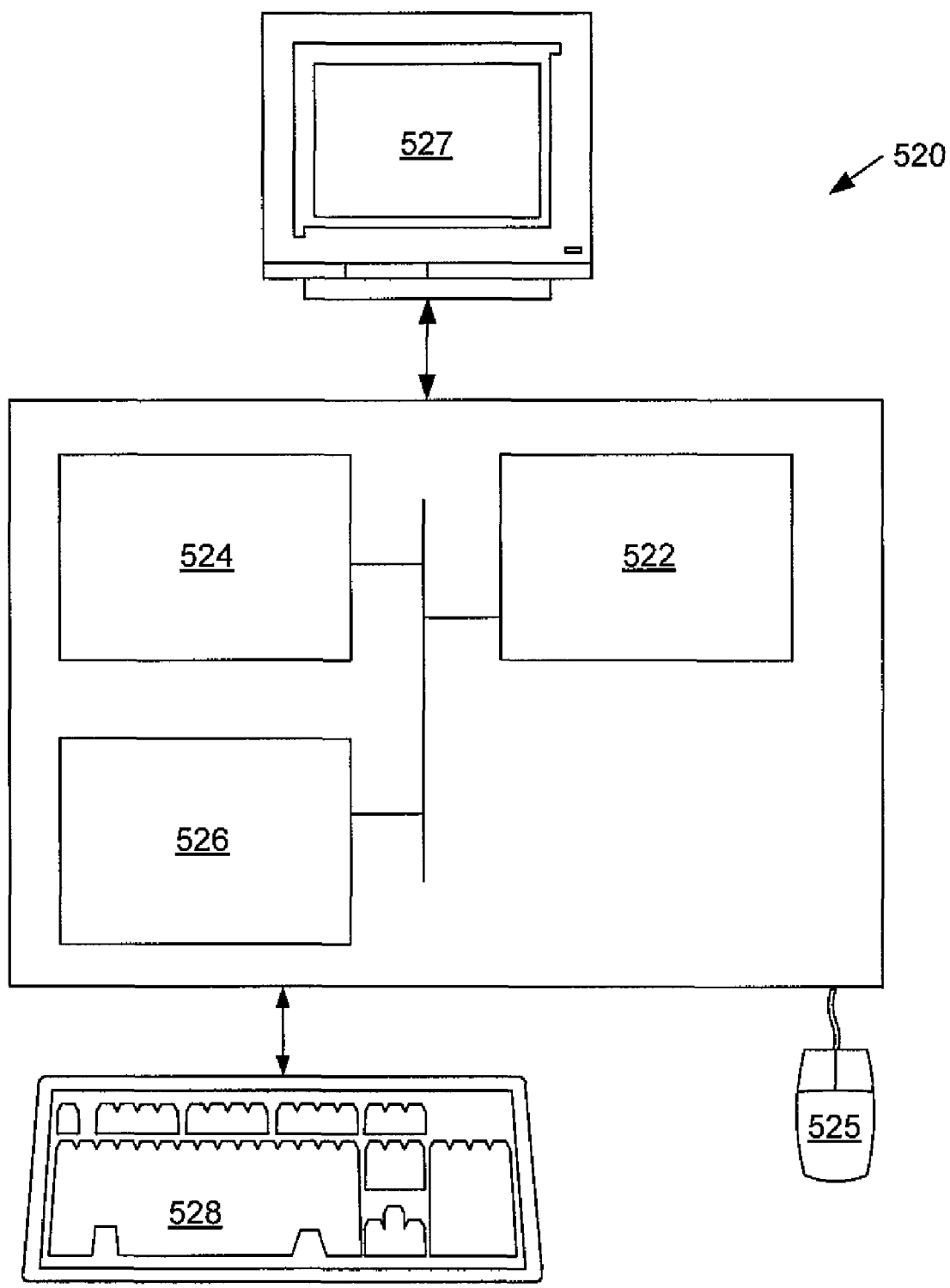
FIG. 5 shows a computer system in accordance with one or more embodiments of the invention.

Embodiments of the invention may be implemented on virtually any type of computer regardless of the platform being used. For example, as shown in FIG. 5, a computer system (520) includes a processor (524), associated memory (526), a storage device (522), and numerous other elements and functionalities typical of today's computers (not shown). The computer (520) may also include input means, such as a keyboard (528) and a mouse (525), and output means, such as a monitor (527). The computer system (520) is connected to a local area network (LAN) or a wide area network (e.g., the Internet) (not shown) via a network interface connection (not shown). Those skilled in the art will appreciate that these input and output means may take other forms.

Further, those skilled in the art will appreciate that one or more elements of the aforementioned computer system (520) may be located at a remote location and connected to the other elements over a network. Further, embodiments of the invention may be implemented on a distributed system having a plurality of nodes. In one or more embodiments of the invention, the node corresponds to a computer system. Alternatively, the node may correspond to a processor with associated physical memory. The node may alternatively correspond to a processor with shared memory and/or resources. Further, software instructions to perform one or more embodiments of the invention may be stored on a computer readable medium such as a compact disc (CD), a diskette, a tape, a file, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for analyzing software test results comprising:
   identifying a failed test result in a test log, wherein the failed test result indicates a first defect, and wherein the failed test result is associated with a first test result identifier;
   identifying, using the first test result identifier, a first defect report corresponding to the first defect, wherein the failed test result was not previously associated with a first defect report corresponding to the first defect, wherein the first defect report comprises a first defect description and the first test result identifier, and wherein the first defect report is stored in a defect report repository;
   associating the failed test result with the first defect report by storing a first selectable link to the first defect report in the failed test result when the failed test result was not previously associated with the first defect report.

2. The method of claim 1, wherein determining whether the failed test result was previously associated with the first defect report further comprises:
   retrieving identifying information for the failed test result; and
   using the identifying information to search the defect report repository to locate the first defect report.

3. The method of claim 2, wherein associating the failed test result with the first defect report further comprises associating the first defect report with a unique identifier of the failed test result.

4. The method of claim 3, wherein using the identifying information further comprises using the identifying information to determine the unique identifier.

5. The method of claim 1, further comprising:
   displaying the first defect report responsive to user selection of the selectable link.

6. The method of claim 1, further comprising:
   identifying that the failed test result indicates a second defect;
   determining that the failed test result was not previously associated with a second defect report corresponding to the second defect;
   in response to the determination that the failed test result was not previously associated with a second defect report corresponding to the second defect:
      storing the second defect report in the defect report repository;
      associating the failed test result with the second defect report by storing a second selectable link to the second defect report in the failed test result; and
      storing a unique identifier for the failed test result in the second defect report.

7. The method of claim 1, wherein the test log is generated by a Java test harness.

8. The method of claim 1, wherein the failed test result is comprised in a test suite of a technology compatibility kit (TCK).

9. A system for analyzing software test results comprising:
   a test harness configured to execute a plurality of test cases and generate a test log, wherein the test log comprises test results for a portion of the plurality of test cases; and
   a test log analysis component configured to:
      identify a failed test result in a test log, wherein the failed test result indicates a first defect, and wherein the first failed test result is associated with a first test result identifier;
      identify, using the first test result identifier, a first defect report corresponding to the first defect, wherein the failed test result was not previously associated with a first defect report corresponding to the first defect, wherein the first defect report comprises a first defect description and the first test result identifier, and wherein the first defect report is stored in a defect report repository;
      associate the failed test result with the first defect report by storing a first selectable link to the first defect report in the failed test result when the failed test result was not previously associated with the first defect report.

10. The system of claim 9, further comprising:
    the defect report repository configured to store the related defect report,
    wherein the test log analysis component is further configured to determine whether the failed test result has a related defect report by:
       retrieving identifying information for the failed test result; and
       using the identifying information to search the defect report repository to locate the first defect report.

11. The system of claim 10, wherein the test log analysis component is further configured to associate the failed test result with the first defect report by associating the first defect report with a unique identifier of the failed test result.

12. The system of claim 11, wherein using the identifying information further comprises using the identifying information to determine the unique identifier.

13. The system of claim 9, further comprising:
a defect tracking system configured to receive a second defect report and store the second defect report in the defect report repository,
wherein the defect tracking system:
receives the second defect report for the failed test result when the failed test result was not previously associated with a second defect report corresponding to the second defect; and
stores a unique identifier for the failed test result in the second defect report.

14. The system of claim 9, wherein the test harness is a Java test harness.

15. The system of claim 9, wherein the failed test result is comprised in a test suite of a TCK.

16. A computer readable medium comprising computer program code embodied therein for analyzing software test results, the computer program code comprising instructions to:
identify a failed test result in a test log, wherein the failed test result indicates a first defect, and wherein the failed test result is associated with a first test result identifier;
identify, using the first test result identifier, a first defect report corresponding to the first defect, wherein the failed test was not previously associated with a first defect report corresponding to the first defect, wherein the first defect report comprises a first defect description and the first test result identifier, and wherein the first defect report is stored in a defect report repository;
associate the first failed test result with the first defect report by storing a first selectable link to the first defect report in the failed test result when the first failed test result was not previously associated with the first defect report.

17. The computer readable medium of claim 16, wherein the instruction to determine whether the failed test result has a related defect report further comprise instructions to:
retrieve identifying information for the failed test result; and
use the identifying information to search the defect report repository to locate the first defect report.

18. The computer readable medium of claim 16, wherein the computer program code further comprises instructions to:
display the first defect report responsive to user selection of the selectable link.

19. The computer readable medium of claim 16, wherein the computer program code further comprises instructions to:
identify that the failed test result indicates a second defect;
determine that the failed test result was not previously associated with a second defect report corresponding to the second defect;
store the second defect report in the defect report repository;
associate the failed test result with the second defect report by storing a second selectable link to the second defect report in the failed test result; and
store a unique identifier for the failed test result in the second defect report.

20. The computer readable medium of claim 16, wherein the failed test result is comprised in a test suite of a technology compatibility kit (TCK).

* * * * *

UNITED STATES PATENT AND TRADEMARK OFFICE
CERTIFICATE OF CORRECTION

PATENT NO. : 7,836,346 B1  
APPLICATION NO. : 11/761300  
DATED : November 16, 2010  
INVENTOR(S) : Davidov et al.

Page 1 of 1

It is certified that error appears in the above-identified patent and that said Letters Patent is hereby corrected as shown below:

In Claim 10, column 10, line 60, the words "for the failed test" should read --for the test--.

Signed and Sealed this
Eighth Day of February, 2011

David J. Kappos
*Director of the United States Patent and Trademark Office*